United States Patent

Kaplan et al.

[11] 3,735,335
[45] May 22, 1973

[54] ELECTRONIC FENCE VEHICLE LOCATER TRANSMITTER AND SYSTEM USING SAME

[75] Inventors: Gerald Stanley Kaplan, Trenton; Joshua Shefer, Princeton, both of N.J.

[73] Assignee: RCA Corporation, New York, N.Y.

[22] Filed: Dec. 20, 1971

[21] Appl. No.: 209,961

[52] U.S. Cl. ................340/23, 343/6 R, 343/6.5 R, 343/112 TC
[51] Int. Cl. .............................G08g 1/12, G01s 9/00
[58] Field of Search ...............343/6 R, 6.5 R, 6.5 LC, 343/112 TC; 340/23

[56] References Cited

UNITED STATES PATENTS

| 3,004,258 | 10/1961 | Cohen et al. | 343/112 TC |
| 3,419,865 | 12/1968 | Chisholm | 343/112 TC |
| 3,644,883 | 2/1972 | Borman et al. | 340/23 |

Primary Examiner—T. H. Tubbesing
Attorney—Edward J. Norton and Robert L. Trocke

[57] ABSTRACT

A vehicle location system in which two different messages are sent in opposite directions from a common vehicle locator transmitter. Vehicle location and direction is determined by the vehicle storing the different messages and, when interrogated, replying with a message that indicates on which side of the vehicle locator transmitter the vehicle is located.

5 Claims, 6 Drawing Figures

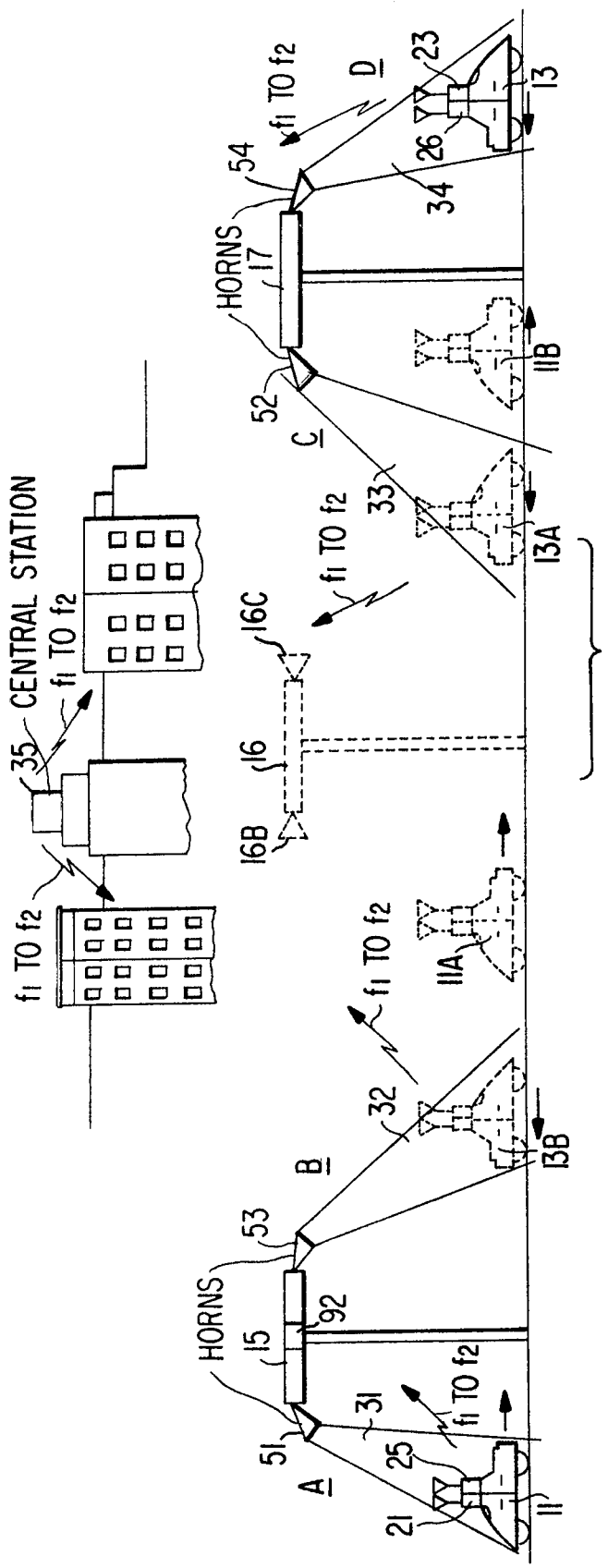
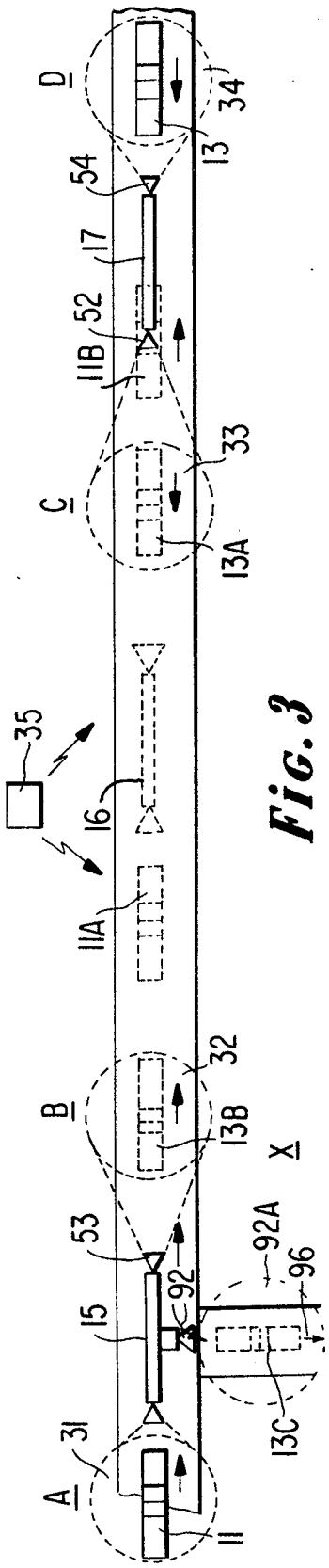
Fig. 2
Fig. 3

ELECTRONIC FENCE VEHICLE LOCATER TRANSMITTER AND SYSTEM USING SAME

BACKGROUND OF THE INVENTION

1. Field of the Invention

This invention relates to a system for determining a vehicle's location and more particularly for more precisely determining the vehicle's location and direction without increasing the number of vehicle locator transmitter units distributed about a city, for example.

2. Description of Prior Art

Various automated systems for identifying the location of transportation vehicles have been developed. One system commonly referred to as the "signpost" system utilizes the proximity of a vehicle to a transmitter to determine the vehicle's location. In the "signpost" system a plurality of relatively small coverage, area transmitters each including a signal source and a radiating element are distributed about a city, for example, with these transmitters located at positions where vehicles commonly pass. The coverage area of these transmitters is kept small so that transmitted signals do not overlap each other. The transmitters continuously emit digitally coded messages (identifying the signpost) which are received and stored by a passing vehicle. Upon interrogation of the vehicle from a central location to determine the vehicle's location, the vehicle responds with the last stored message. There is no indication at the central location as to which direction the vehicle is heading. There is therefore no way of knowing where the vehicle is located between the last "signpost" transmitter and any of the adjacent " signpost" transmitters. A more precise determination of the location of the vehicles can be provided by restricting the direction and the routes of the vehicles and by adding more "signpost" transmitters. Restricting the direction and routes of some types of vehicles such as taxi cabs may not be practical. To add more "signpost" transmitters to account for all the possible direction and route changes would in most cases be too costly.

SUMMARY OF THE INVENTION

According to the present invention, each of a plurality of electronic fence transmitters generates at least two different messages with one message being sent from a given transmitter location in one expected direction of a vehicle and the other message being sent from said given location in a different expected direction of the vehicle. In this manner not only does the central station know when the vehicle has passed a vehicle locator transmitter, but also the central station knows generally the vehicle's direction.

DESCRIPTION OF THE DRAWING

A further description follows in conjunction with the following drawings wherein:

FIG. 2 is a sketch of an electronic fence vehicle locator system in a city illustrating portions of four zones.

FIG. 3 is a top plan view of the vehicle locator system sketched in FIG. 2.

DETAILED DESCRIPTION OF A PREFERRED EMBODIMENT

Figure 1:
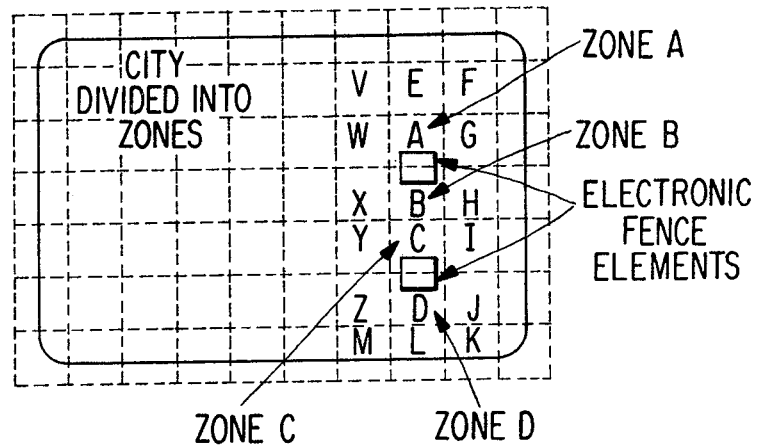
FIG. 1 is a sketch illustrating an area such as a city divided into zones.

Referring to FIG. 1, the city or area to be covered by the vehicle locator system is divided into zones. In accordance with the electronic fence vehicle locator system, electronic fence transmitters are located at the border between two zones such as between zones C and D. The electronic fence transmitter is a radio frequency signal transmitter that sends different coded messages in different directions such as in opposite directions to zones C and D, for example. A vehicle passing the electronic fence transmitter such as from zone C to zone D for example, receives a different coded message on either side of the electronic fence transmitter and hence the coded message received is dependent on which side of the boundary or electronic fence the vehicle is located.

Referring to FIGS. 2 and 3, there is illustrated portions of four zones (A, B, C, and D) of a city. Vehicles 11 and 13 in FIG. 2 each have a typical mobile two-way radio—radios 21 and 23 respectively—and a vehicle locator receiver—receivers 25 and 26 respectively. As indicated above, a plurality of electronic fence transmitters—such as electronic fence transmitters 15 and 17—are distributed at the boundaries of the zones of a city. Electronic fence transmitter 15 is located on the boundary of zones A and B and sends a first coded message in the direction of zone A. The electronic fence transmitter 15 also sends a second coded message in the opposite direction or toward zone B. At a more distant location—a thousand feet down a city street for example—is located a second electric fence transmitter 17. The electronic fence transmitter 17 is located on the boundary of zones C and D and sends a first coded message in the direction of zone C. The second electronic fence transmitter 17 sends a second coded message in the opposite direction toward zone D.

At some point in the city is located a central station 35. This central station 35 communicates with the vehicles 11 and 13 via two-way radios 21 and 23 of vehicles 11 and 13 respectively at frequencies from, for example, $f_1$ to $f_2$ frequency range.

The electronic fence transmitters 15 and 17 for example, communicate with the vehicles 11 and 13 via the vehicle locator receivers 25 and 26 at the higher $f_3$ frequency. In the embodiment herein described, the frequency $f_3$ is in the X-band microwave frequency region and frequencies $f_1$ to $f_2$ are the present mobile radio frequency bands. By transmitting at X-band frequencies with a suitable antenna such as a waveguide horn antenna, a fairly directional pattern as illustrated by restricted areas of reception of 31, 32, 33 and 34 in FIGS. 2 and 3. Also, by properly thresholding the receivers 25 and 26, there is little chance of a vehicle in zone A, for example, receiving and storing a wrong message indicating it is at zone B, even if it is very close to the location of electronic fence transmitter 15.

Figure 4:
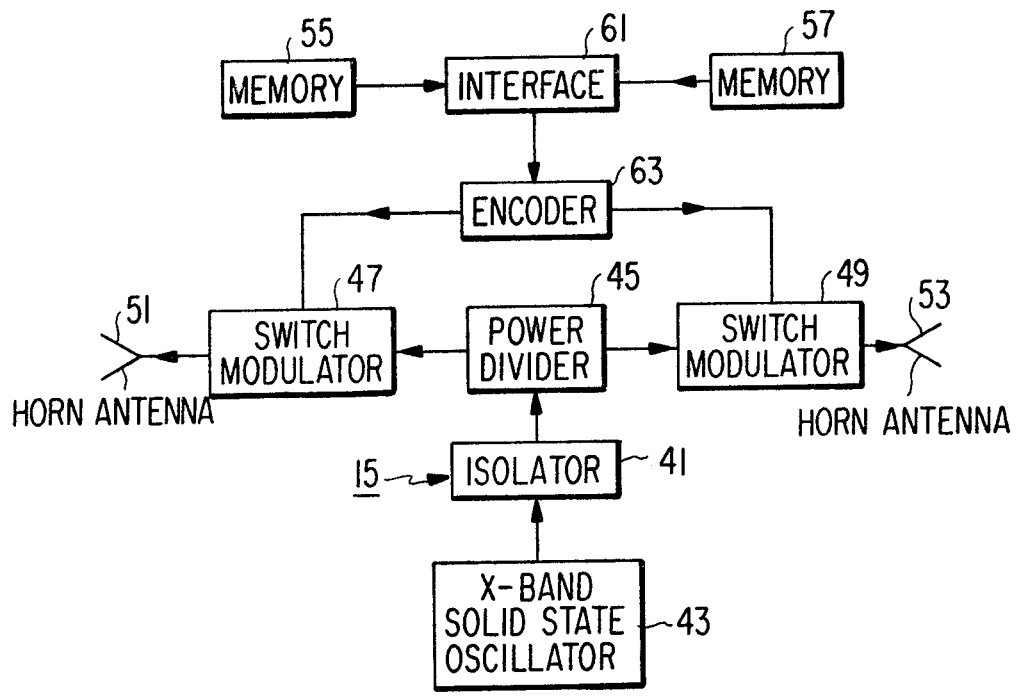
FIG. 4 is a block diagram of the electronic fence vehicle locator transmitter.

Referring to FIG. 4, there is illustrated a block diagram of the electronic fence transmitter 15. The transmitter 15 includes an X-band solid state generator 43. This generator 43 may be, for example, an avalanche diode which is capable of operating at 10.6 GHz and producing 10 milliwatts of CW power in a waveguide. The X-band output of the oscillator 43 is coupled through a 20 db isolator 41 to a 3 db coupler or power divider 45 where the CW band output power is equally divided and applied to separate switch modulators 47 and 49.

The switch modulators 47 and 49 may include, for example, silicon diode switches inserted in a waveguide. These switches operate in the manner of a shutter such that when biased in one condition all of the energy propagates through the waveguide to the horn antenna and when biased in the other condition a short circuit is effectively introduced across the waveguide.

The messages from the electronic fence transmitter 15 are provided by memories 55 and 57. The output from memories 55 and 57 consists of a 10 bit code of "marks" and "space" signal information of which 9 bits may encode the zone number following the start bit. The 10 bits of "mark" or "space" information from the memories 55 and 57 are switched via interface 61 to encoder 63. The output of encoder 63 operates the switch modulators 47 and 49. At the output of encoder 63 there is provided a "mark" tone of 10 $kH_z$ or a "space" tone of 12 $kH_z$. Dependent upon whether the signal bit from either the memory 55 or 57 is a "mark" or a "space" signal, a 10 $kH_z$ or 12 $kH_z$ tone is sent to modulators 47 or 49, respectively. For example, if the second bit from memory 55 is a " mark" signal, a 10 $kH_z$ tone is sent from encoder 63 to the diode switches in modulator 47 where the 10 $kH_z$ tone is amplitude modulated on to the 10.6 $gH_z$ wave. Likewise, the "mark" or "space" signal information at memory 57 causes an appropriate 10 $kH_z$ or 12 $kH_z$ tone to be applied to modulator 49. Also, encoder 63 provides switching between the messages coupled out of modulator 47 from memory 55 and those coupled out of modulator 49 from memory 57. In this way, the output message from one modulator may be held off while the other message is being transmitted. The timing functions in the encoder 63 are derived from a master clock running at 120 $kH_z$ with the output from the clock being coupled to a frequency divider.

The output of switch modulator 47 is coupled to a vertically polarized horn antenna 51 which, in turn, radiates the generated X-band signals to the zone A. The output switch modulator 49 is coupled to vertically polarized horn antenna 53. Horn antenna 53 radiates the X-band signals in the direction of zone B.

Figure 5:
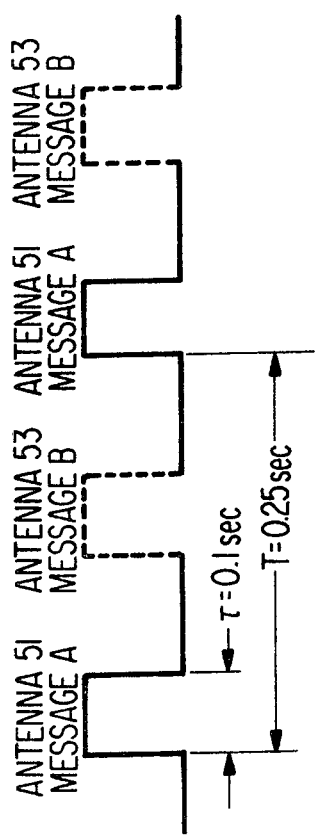
FIG. 5 is a timing diagram of the electronic fence vehicle locator transmitter.

In the operation of the electronic fence transmitter 15, a message is sent out to one side of the boundary or zone such as zone A over antenna 51 and switch modulator 47 for about a tenth of a second and then a different message is sent out to zone B over antenna 53 and switch modulator 49 for about a tenth of a second. Referring to the waveform of FIG. 5, the message A (indicates zones A) at antenna 51, for example, may be about 0.1 second duration with the message A from antenna 51 being repeated every 0.25 seconds. This insures that a vehicle travelling at speeds up to 80 miles per hour will receive a minimum of four messages from a given fence transmitter if the fence transmitter range is 120 feet. Between each message A from antenna 51 is a second message B (indicates zone B) from antenna 53. This second message is likewise 0.1 seconds duration with the message B repeated every 0.25 seconds.

Figure 6:
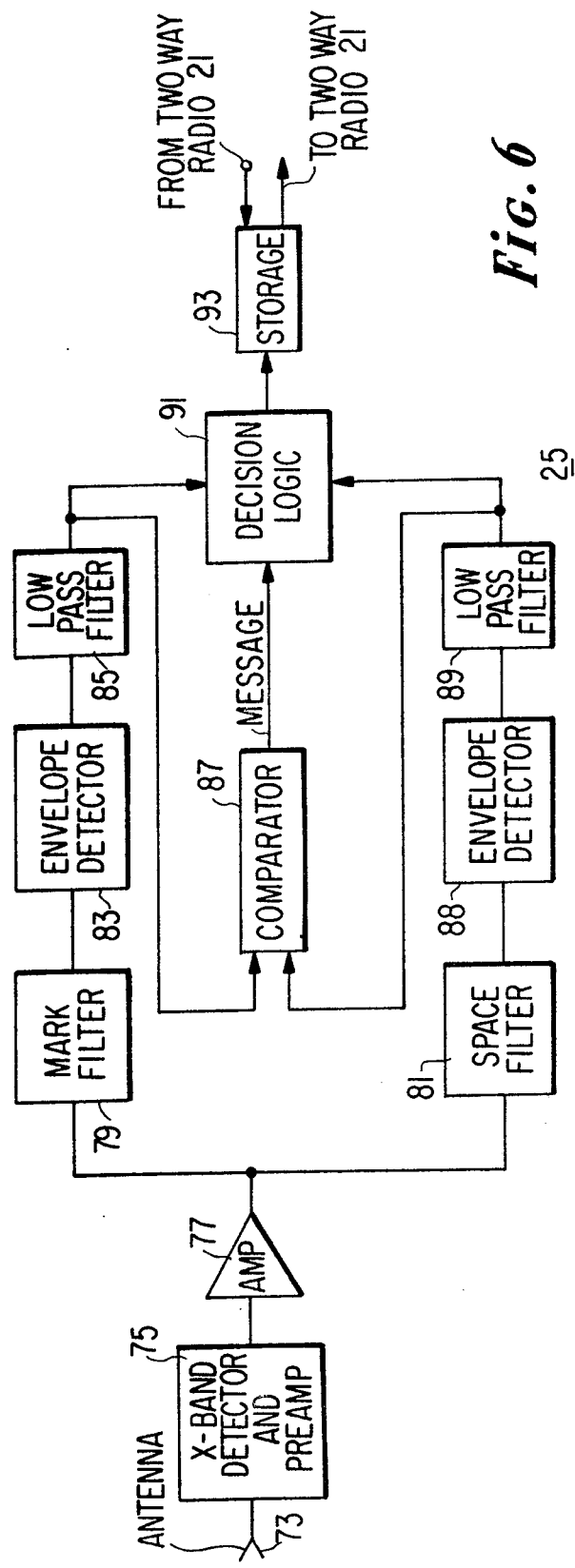
FIG. 6 is a block diagram of the vehicle locator receiver.

Referring to FIG. 6, there is illustrated a block diagram of the vehicle locator receiver 25 for vehicle location of vehicle 11. The amplitude modulated "mark" or "space" tone message is received at receiver antenna 73 and is fed to X-band detector and preamplifier 75. The detector may be, for example, a tunnel diode detector and preamplifier. The audio output from detector and preamplifier 75 is amplified by audio amplifier 77 and coupled to tone selective filters 79 and 81. If the second bit of the 10 bit code is, for example, a "mark" tone (10 $kH_z$ for example) it is coupled out of filter 79, detected by envelope detector 83 and the detected output coupled through low-pass filter 85 to comparator 87. If the third bit of the 10 bit code is a "space" tone (12 $kH_z$ for example) it is coupled through filter 81, detected at envelope detector 88 and the detected output coupled through low-pass filter 89 to comparator 87. At comparator 87 the output from detector 83 is compared with the simultaneous output from detector 88. If the stronger of the two outputs indicates a "mark" signal then a "mark" signal message is coupled out of comparator 87 through the decision logic 91 to storage 93. Similarly, if the stronger of the two outputs indicates a "space" signal, then a "space" signal message is coupled out of comparator 87 to logic 91 and storage 93. Threshold and parity checks can be provided at the decision logic 91 coupled to the output of comparator 87 and the outputs from envelope detectors 83 and 88. When the signal after going through the threshold and parity checks has been determined to be valid, that message then replaces the previously stored message in the storage 93. The storage signal in the storage 93 is coupled to the normal mobile two-way radio such as mobile radio 21 in FIG. 2. When the mobile two-way radio 21 is interrogated by the central station 35 the message in storage 93 is transmitted by the transmitter portion of the mobile two-way radio to the central station 35.

Referring to FIGS. 2 and 3 considering the operation of the above described system, each of the vehicle locator electronic fence transmitters 15 and 17 sends two coded messages at the X-band frequency of $f_3$. Referring to FIG. 3, the sphere of reception associated with the transmitted output from horn antenna 51 is designated area 31 and the sphere of reception associated with the transmitted output from horn antenna 53 is indicated by area 32. Similarly, the sphere of reception associated with the electronic fence transmitter's 17 output via horn antenna 52 is indicated by area 33 and the sphere of reception associated with the electronic fence transmitter's 17 output via horn antenna 54 is indicated by area 34.

Vehicle 13 is in the area of reception 34 of a message D (indicates zone D) from transmitter 17. When vehicle's 13 two-way radio 23 is interrogated by central station 35, the two-way radio 23 replies with the stored message in vehicle 13's receiver 26, which message indicates that it is at zone D. Similarly, vehicle 11 replies with the stored message A in receiver 21 that indicates that it is at zone A.

If after a very short time period when the vehicles 11 and 13 are again interrogated by central station 35 and the message from two-way radio 23 is that code from zone C, it can be determined that the vehicle 13 (indicated by dashed lines 13A), is located in zone C, is close to transmitter 17 in zone C, has traveled to the left, is generally heading toward zone B and is not heading toward adjacent zones Z, M, L and K in FIG. 1. If the two-way radio 21 of vehicle 11 (indicated by dashed lines 11A) transmits zone B when interrogated, it can then be determined that the vehicle has traveled to the right in FIGS. 2 and 3, is close to transmitter 15 and is on that side transmitter 15 associated with zone B.

If after a longer period of time, the two-way radio 21 of vehicle 11 when interrogated replies zone C (vehicle identified by dashed lines 11B in FIGS. 2 and 3), then it is known that the vehicle 11 has left the area of zone B, has continued to travel to the right and is on the left side of transmitter 17. If the range of transmitter 17 is 120 feet, it is known that the vehicle 11 is within 120 feet of the left of transmitter 17. If at that predetermined longer period of time, the two-way radio 23 of vehicle 13 replies zonal message B, it is known that vehicle 13 has left zone C, has continued to travel to the left and is on the right side of transmitter 15 (see vehicle 13 identified by dashed lines 13B). If the transmitter 15 range is 120 feet, it is known that vehicle 13 is within 120 feet of the right side of transmitter 15.

If increased accuracy of vehicle location is desired, particularly between zones B and C, for example, a transmitter 16 may be provided between zones B and C with one horn 16B transmitting message B toward zone B and horn 16C transmitting message C toward zone C. Additionally such bidirectional transmitters may be located at all of the zone boundaries as indicated by the dashed lines in FIG. 1.

If the interrogation rate from the central station 35 is so slow that a vehicle may pass a zone without being interrogated, the storage unit (storage 93 for example, in receiver 25) in the vehicle location receiver can be arranged to store the last two different messages in order received. Upon interrogation the message replied would be that of the vehicles last two zones, thus giving not only the vehicle location (last zonal message) but also the vehicle direction.

As can be seen by the above, a vehicle can be more precisely located because the vehicle heading can be determined as it passes the transmitter and because the vehicle intercepts two directionally transmitted coded messages between the two transmitters. A first of these two coded messages says that the vehicle is to one given side of a first transmitter and the second message says it is to one given side of the other transmitter.

A further feature of the invention is the provision of a third or a fourth directionally transmitted coded message from the same electronic fence transmitter. For example, electronic fence transmitter 15 may include a third message generator with that third message transmitted via a third horn 92 (see FIG. 3) oriented in a direction orthogonal to horns 51 and 53. This modified electronic fence arrangement may be placed at an intersection of streets as shown in FIG. 3 with horn 92 pointing in the direction of the intersecting street. The message transmitted over horn 92 would have a sphere of reception of 92A, for example. If, for example, vehicle 13 was later interrogated and it replied with a zone message X that was associated with that message transmitted over horn 92, it would clearly indicate that vehicle 13 turned and was heading in the direction of arrow 96.

What is claimed is:

1. In a vehicle location system of the type wherein a plurality of vehicle locator transmitters are distributed about a given area so that a central station having a transceiver can determine the location of vehicles which contain mobile transceivers and vehicle location receivers, said vehicle location transmitter transmitting coded messages, said vehicle receiver responsive to said coded messages for storing said message, said mobile transceiver coupled to said vehicle receiver and being responsive to an interrogation message from said central station for transmitting said coded message in said vehicle receiver to said central station indicating vehicle location, an improvement in the vehicle location transmitter of the system comprising:

means for generating a plurality of messages with each message identifying different subareas or zones in said given area, means responsive to said generating means for transmitting from a common location each of said plurality of messages with a different messages sent to each zone.

2. The combination claimed in claim 1 including means coupled between said generating means and said transmitting means for transmitting said messages sequentially.

3. The combination claimed in claim 1 wherein said plurality of messages is two and said messages are transmitted in opposite directions.

4. The combination claimed in claim 3 wherein said transmitting means further includes a pair of horn antennas with their output ends facing in opposite directions.

5. The combination claimed in claim 1 wherein said transmitting means includes a single microwave generator.

* * * * *